US008938585B1

(12) United States Patent
Rohana et al.

(10) Patent No.: US 8,938,585 B1
(45) Date of Patent: *Jan. 20, 2015

(54) TRANSPARENT PROCESSING CORE AND L2 CACHE CONNECTION

(71) Applicant: Marvell Israel (M.I.S.L) Ltd., Yokneam (IL)

(72) Inventors: Tarek Rohana, Santa Clara, CA (US); Gil Stoler, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,195

(22) Filed: Mar. 25, 2014

Related U.S. Application Data

(63) Continuation of application No. 12/624,213, filed on Nov. 23, 2009, now Pat. No. 8,688,911.

(60) Provisional application No. 61/117,714, filed on Nov. 25, 2008.

(51) Int. Cl.
*G06F 13/00* (2006.01)
*G06F 12/08* (2006.01)

(52) U.S. Cl.
CPC ........ *G06F 12/0888* (2013.01); *G06F 12/0811* (2013.01)
USPC .... 711/118; 711/138; 711/139; 711/E12.043; 710/305

(58) Field of Classification Search
None
See application file for complete search history.

(56) References Cited

U.S. PATENT DOCUMENTS

| | | |
|---|---|---|
| 4,190,885 A | 2/1980 | Joyce et al. |
| 5,386,503 A | 1/1995 | Staggs et al. |
| 5,459,840 A | 10/1995 | Isfeld et al. |
| 5,623,627 A | 4/1997 | Witt |
| 5,625,793 A | 4/1997 | Mirza |
| 5,689,670 A | 11/1997 | Luk |
| 6,012,134 A | 1/2000 | McInerney et al. |
| 6,157,981 A | 12/2000 | Blaner et al. |
| 6,546,461 B1 | 4/2003 | Au et al. |
| 6,604,174 B1 | 8/2003 | Dean et al. |
| 6,629,268 B1 * | 9/2003 | Arimilli et al. ............... 711/135 |
| 6,918,009 B1 | 7/2005 | Sato et al. |
| 6,928,451 B2 | 8/2005 | Mogi et al. |
| 7,209,996 B2 | 4/2007 | Kohn et al. |
| 7,240,160 B1 | 7/2007 | Hetherington et al. |
| 7,574,548 B2 | 8/2009 | Drapala et al. |
| 2001/0005871 A1 | 6/2001 | Shimoda et al. |
| 2004/0260872 A1 | 12/2004 | Depta |
| 2006/0095636 A1 * | 5/2006 | Gilbert et al. ................. 710/309 |
| 2007/0252843 A1 * | 11/2007 | Yu et al. ........................ 345/557 |
| 2008/0046736 A1 | 2/2008 | Arimilli et al. |
| 2008/0313328 A1 | 12/2008 | Dahlin et al. |

* cited by examiner

*Primary Examiner* — Michael Krofcheck (57) ABSTRACT

Embodiments of the present disclosure provide a system on a chip (SOC) comprising a processing core including a core bus agent, a bus interface unit (BIU), and a bridge module operatively coupling the processing core to the BIU, the bridge module configured to selectively route information from the core bus agent to a cache or to the BIU by bypassing the cache. Other embodiments are also described and claimed.

18 Claims, 6 Drawing Sheets

TRANSPARENT PROCESSING CORE AND L2 CACHE CONNECTION

CROSS REFERENCE TO RELATED APPLICATIONS

The present disclosure is a continuation of and claims priority to U.S. patent application Ser. No. 12/624,213, filed on Nov. 23, 2009, now U.S. Pat. No. 8,688,911, issued Apr. 1, 2014, which claims priority to U.S. Provisional Patent Application No. 61/117,714 filed Nov. 25, 2008, which are incorporated herein by reference.

TECHNICAL FIELD

Embodiments of the present disclosure relate to processing core and L2 cache connection, and more particularly, to transparent processing core and L2 cache connection.

BACKGROUND

A system on a chip (SOC) generally includes at least one processing core, which generally is operatively coupled to a level 2 (L2) memory cache. Various core bus agents included in the processing core, the L2 cache, and various other components of the SOC are usually interconnected through a bus interface unit (BIU). However, the L2 cache may have a bandwidth and a frequency requirement that is different from one or more other components of the SOC. For example, the L2 cache may operate on a clock signal that has a different frequency compared to a frequency of a clock signal of the processing core. Such differences in the bandwidth and/or frequency requirement between the L2 cache and other components accessing the BIU may create additional challenges while designing the SOC.

The description in this section is related art, and does not necessarily include information disclosed under 37 C.F.R. 1.97 and 37 C.F.R. 1.98. Unless specifically denoted as prior art, it is not admitted that any description of related art is prior art.

SUMMARY

In an embodiment, the present disclosure provides a system on a chip (SOC) comprising a processing core including a core bus agent, a bus interface unit (BIU); and a bridge module operatively coupling the processing core to the BIU, the bridge module configured to selectively route information from the core bus agent to a cache or to the BIU by bypassing the cache. In an embodiment, the bridge module imitates a role of the BIU to the core bus agent, and the bridge module imitates a role of the core bus agent to the BIU. The bridge module is further configured to selectively route information from the core bus agent to the cache, at least if the cache is present in the SOC and if the information is cacheable, and selectively route information from the core bus agent to the BIU by bypassing the cache, at least if the cache is not present in the SOC or if the information is non-cacheable. In an embodiment, the bridge module is further configured to selectively route information from the BIU to the cache, at least if the cache is present in the SOC and if the information is cacheable. The bridge module is further configured to selectively route information from the BIU to the core bus agent, at least if the cache is not present in the SOC, if the information is received based on a cache miss command, or if the information is non-cacheable. The bridge module is further configured to selectively route information from the BIU to the cache, at least if the cache is present in the SOC and if the information is received based on a pre-fetch command of the cache, and refrain from routing information from the BIU to the processing core, at least if the information is received based on a pre-fetch command of the cache.

In an embodiment, the bridge module comprises a first bridge unit and a second bridge unit, the first bridge unit including a first module and the second bridge unit including a second module, the second module including a multiplexer, the first module configured to receive information from the core bus agent, and selectively route received information from the core bus agent to the multiplexer and/or to the cache. The second module is configured to receive information from the first bridge unit and/or the cache, and multiplex received information from the first bridge unit and/or the cache to the BIU. In an embodiment, the core bus agent is a first core bus agent, the SOC further comprising a second core bus agent configured to directly trans-receive information with the BIU, bypassing the bridge module. The first core bus agent may be one of an instruction cache and an information cache, the second core bus agent may be a memory management unit, and the cache may be a level 2 (L2) cache. The cache is clocked by a first clock signal having a first frequency that is different from a second frequency of a second clock signal that clocks the core bus agent.

There is also provided a method of operating a system on a chip (SOC) comprising a processing core and a bridge module, the processing core including a bus agent, the method comprising receiving, by the bridge module, information from the bus agent, and selectively routing, by the bridge module, information received from the bus agent to a cache or to a bus interface unit (BIU) included in the SOC. The selectively routing information received from the bus agent further comprises selectively routing information received from the bus agent to the cache at least if the cache is operatively coupled to the bridge module and if the information received from the bus agent is cacheable; and selectively routing information received from the bus agent to the BIU included in the SOC at least if the cache is not operatively coupled to the bridge module or if the information received from the bus agent is not cacheable.

In an embodiment, the method further comprises receiving, by the bridge module, information from the BIU; selectively routing, by the bridge module, information received from the BIU to the cache at least if the cache is present in the SOC and if the information received from the BIU is cacheable; and selectively routing, by the bridge module, information received from the BIU to the bus agent at least if the cache is not present in the SOC, if the information is received based on a cache miss command, or if the received information is not cacheable. The method further comprises receiving, by the bridge module, information from the cache; and selectively routing, by the bridge module, information received from the cache to the bus agent or to the BIU based at least in part on an intended recipient of the information.

In an embodiment, the bus agent is a first bus agent, wherein the processing core includes a second bus agent, the method further comprising directly trans-receiving information between the second bus agent and the BIU, bypassing the bridge module.

There is also provided a system on a chip (SOC) comprising a processing core including a core bus agent; and a bridge module comprising a first bridge unit and a second bridge unit, the first bridge unit including a first module, the second bridge unit including a second module, wherein the first module is configured to receive information from the core bus agent; and selectively route received information from the core bus agent to a level 2 (L2) cache at least if the L2 cache is operatively coupled to the bridge module and if the received information from the core bus agent is cacheable. The first module is further configured to selectively route received information from the core bus agent to the second module at least if a L2 cache is not operatively coupled to the bridge module or if the received information from the core bus agent is non-cacheable; and wherein the second module is configured to selectively route information received from the first module and/or from the cache to a bus interface unit (BIU). The SOC further comprises a bus interface unit (BIU), wherein the second module is configured to receive information from the BIU; and selectively route received information from the BIU to the first module and/or to the L2 cache.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

Figure 1A:
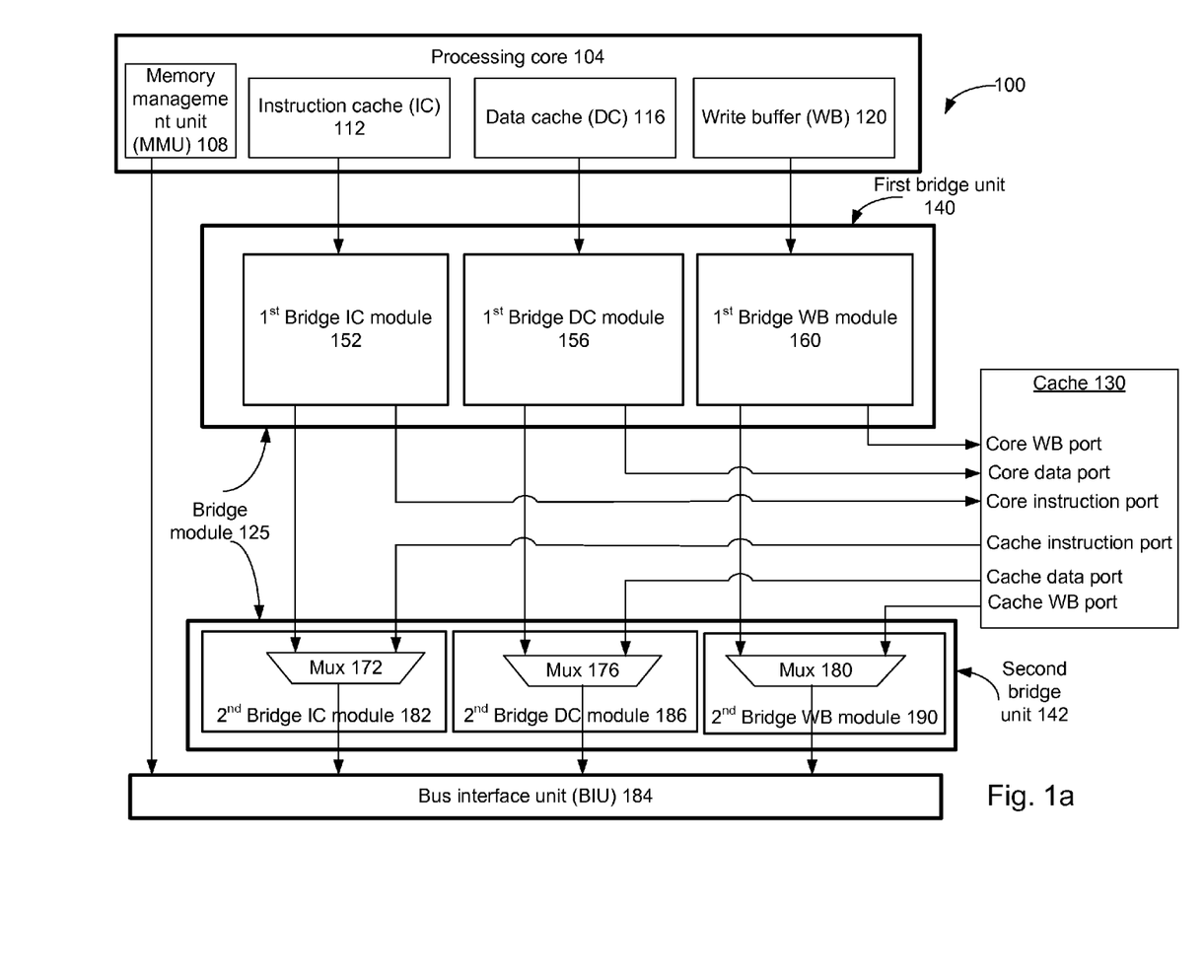
FIG. 1a schematically illustrates a system on a chip (SOC), in accordance with an embodiment of the present disclosure.

FIG. 1a schematically illustrates a highly simplified system on a chip (SOC) 100, in accordance with an embodiment of the present disclosure. The SOC 100 includes one or more processing cores, including processing core 104. Only one processing core is shown for the sake of simplicity and to avoid obfuscating teaching principles of the present disclosure. The SOC 100 also includes a bus interface unit (BIU) 184 configured to operatively couple one or more components of the processing core 104 with one or more other components of the SOC 100.

The processing core 104 includes a memory management unit (MMU) 108, an instruction cache (IC) 112, a data cache 116, and a write buffer (WB) 120. In an embodiment, the MMU 108 manages one or more memory units (e.g., one or more memory units included in the SOC 100 and/or external to the SOC 100, not illustrated in FIG. 1a) of the SOC 100, the IC 112 caches one or more instructions or codes for the processing core 104, the DC 116 caches data for the processing core 104, and the WB 120 buffers data to be written by the processing core 104 to, for example, a memory and/or a cache included in (or external to) the SOC 100. In an embodiment, the IC 112 and/or the DC 116 acts as a level 1 (L1) cache of the processing core 104.

For the purpose of this disclosure and unless otherwise mentioned, instructions and data refer to different types of information. For example, instructions refer to information that is received, transmitted, cached, accessed, and/or otherwise associated with the instruction cache IC 112, whereas data refers to information that is received, transmitted, cached, accessed, and/or otherwise associated with the data cache DC 116 of the processing core 104. For the purpose of this disclosure and unless otherwise mentioned, information refers to data bits that represent instructions and/or data. Thus, a component of the SOC 100 receiving information implies that the component receives one or more data bits that represent data and/or instructions.

In an embodiment, the MMU 108, IC 112, DC 116 and/or WB 120 interfaces (e.g., transfers information. i.e., transfers data and/or instructions) with one or more other components of the SOC 100 through the BIU 184. That is, the MMU 108, IC 112, DC 116 and/or WB 120 access the BIU 184. Accordingly, the MMU 108, IC 112, DC 116 and/or WB 120 acts as bus agents for the BIU 184. As the MMU 108, IC 112, DC 116 and/or WB 120 are included in a processing core, the MMU 108, IC 112, DC 116 and/or WB 120 are also referred to herein as core bus agents. In an embodiment, one or more of these core bus agents acts as a master to the BIU 184. Although only four core bus agents are illustrated as included in the processing core 104, in an embodiment, the processing core 104 may include any other suitable number of core bus agents as well.

In an embodiment, the SOC 100 also includes a cache 130, which is, for example, a level 2 (L2) cache. In an embodiment, the cache 130 operates on a clock signal that has a different frequency compared to a frequency of a clock signal of the processing core 104 and/or a frequency of a clock signal of the BIU 184.

Referring again to FIG. 1a, the SOC 100 also includes a bridge module 125 that comprises a first bridge unit 140 and a second bridge unit 142. Thus, the first bridge unit 140 and the second bridge unit 142 collectively form the bridge module 125. The bridge module 125 is operatively coupled to the cache 130, as will be described in more detail herein later.

Figure 1B:
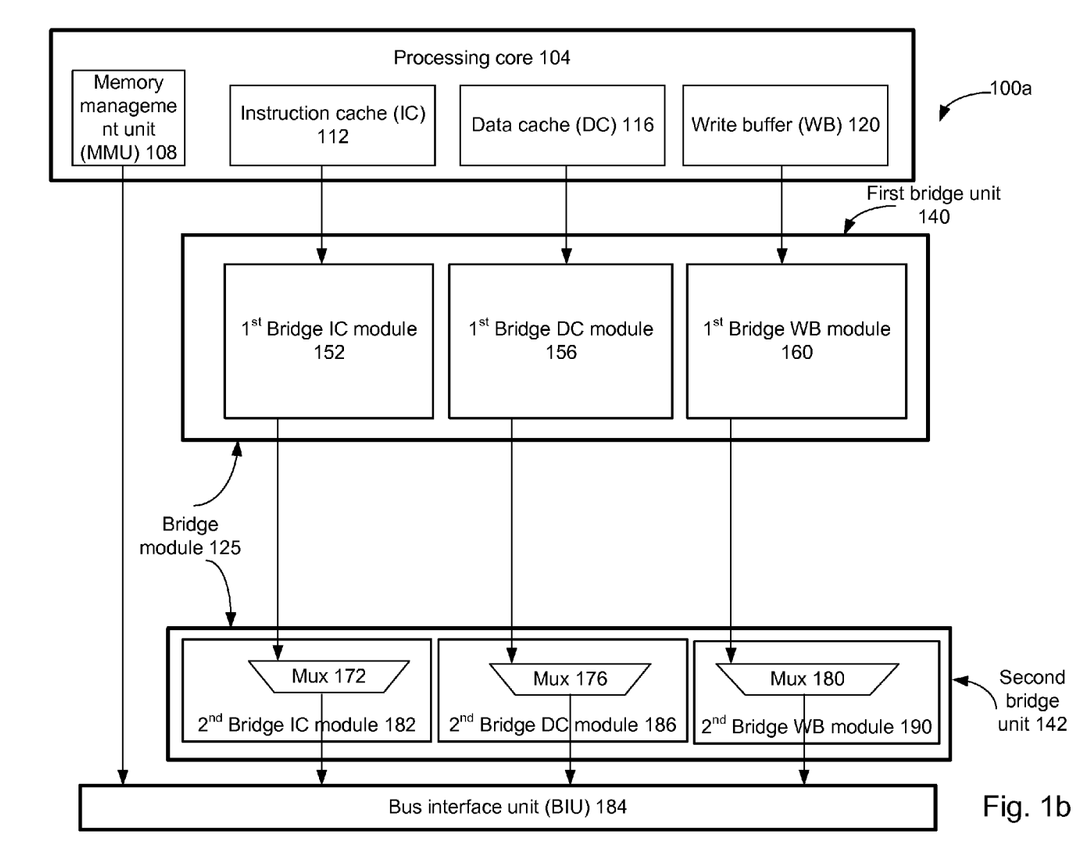
FIG. 1b schematically illustrates another SOC, in accordance with an embodiment of the present disclosure.

In an embodiment, a level 2 cache (e.g., the cache 130) is not included in the SOC 100. In another embodiment, a level 2 cache (e.g., the cache 130) is included in the SOC 100, but not coupled to the bridge module 125. For example, FIG. 1b schematically illustrates an SOC 100a, in accordance with an embodiment of the present disclosure. The SOC 100a is, in a manner, similar to the SOC 100 of FIG. 1a. However, unlike the SOC 100, the SOC 100a of FIG. 1b does not illustrate the cache 130 operatively coupled to the bridge module 125. For example, in FIG. 1b, the cache 130 is not present in the SOC 100, or is present in the SOC 100 but not coupled to the bridge unit 125. In yet another embodiment, the cache 130 is present in the SOC 100, but operates in a disabled mode (e.g., the cache 130 is disabled). In an embodiment, the bridge module 125 detects (or at least is aware of) whether the cache 130 is operatively coupled to the bridge module 125 or not.

In an embodiment, the first bridge unit 140 comprises a first bridge IC module 152 operatively coupled to the IC 112 of the processing core 104. The first bridge IC module 152 is also operatively coupled to an input of a multiplexer (Mux) 172 included in a second bridge IC module 182 of the second bridge unit 142. The first bridge IC module 152 is also operatively coupled to a core instruction port of the cache 130. The cache 130 is operatively coupled to another input of the Mux 172. An output of the Mux 172 is operatively coupled to the BIU 184.

The IC 112 communicates with the BIU 184 and/or the cache 130 through the first bridge IC module 152 and/or the second bridge IC module 182. For example, the first bridge IC module 152 receives information (e.g., one or more instructions or codes) from IC 112. The first bridge IC module 152 selectively transmits the received information to the Mux 172 and/or to the core instruction port of the cache 130 based on various factors, including but not limited to, nature of information (e.g., cacheable or non-cacheable information), status of the cache 130 (e.g., whether the cache 130 is present and/or enabled), and/or the like.

For example, in an embodiment, the first bridge IC module 152 transmits the received information to the cache 130 at least in case the cache 130 is present in the SOC 100, is enabled, and the received information is cacheable (e.g., it is desirable to write the received information in the cache 130, or the received information is configured to be written to the cache 130). In another embodiment, information received by the first bridge IC module 152, from IC 112, is transmitted to the Mux 172 (for transmitting to the BIU 184) at least if the cache 130 is not present in the SOC 100 (e.g., as illustrated in FIG. 1b) or is not operatively coupled to the bridge module 125, if the cache 130 is disabled, and/or if the received information is non-cacheable (e.g., if it is not desirable to write the received information in the cache 130, or the received information is not configured to be written to the cache 130). Mux 172, upon receiving information from the first bridge IC module 152, transmits the received information to the BIU 184. The Mux 172 also transmits information, received from the cache 130 (e.g., from the cache Instruction port), to the BIU 184. The Mux 172 selectively transmits information from the first bridge IC module 152 and/or the cache 130 to the BIU 184 based on, for example, priority, nature, and/or sequence of information received from the first bridge IC module 152 and/or the cache 130.

Referring again to FIG. 1a, the first bridge unit 140 also includes a first bridge DC module 156 operatively coupled to the DC 116 of the processing core 104. The first bridge DC module 156 is operatively coupled to an input of a multiplexer (Mux) 176 included in a second bridge DC module 186 in the second bridge unit 142. The first bridge DC module 156 is operatively coupled to the cache 130 (e.g., to a core data port of the cache 130). The cache 130 is operatively coupled to another input of the Mux 176. An output of the Mux 176 is operatively coupled to the BIU 184.

In operation, the DC 116 communicates with the BIU 184 and/or the cache 130 through the first bridge DC module 156 and/or the second bridge DC module 186. For example, the first bridge DC module 156 receives information (e.g., data) from DC 116. The first bridge DC module 156 selectively transmits the received information to the Mux 176 and/or the cache 130, based on various factors, including but not limited to, nature of information (e.g., cacheable or non-cacheable information), status of the cache 130 (e.g., whether the cache 130 is present and/or enabled), and/or the like.

For example, in an embodiment, the first bridge DC module 156 transmits the received information to the cache 130 at least in case the cache 130 is present in the SOC 100, is enabled, and the received information is cacheable. In another embodiment, information received by the first bridge DC module 156 from DC 116, is transmitted to the Mux 176 in case the cache 130 is not present in the SOC 100 (e.g., as illustrated in FIG. 1b) or is not operatively coupled to the bridge module 125, if the cache 130 is disabled, and/or if the received information is non-cacheable. Mux 176, upon receiving information from the bridge DC module 156, transmits the received information to the BIU 184. The Mux 176 also transmits information, received from the cache 130 (e.g., from the cache data port), to the BIU 184. The Mux 176 selectively transmits information from the first bridge DC module 156 and/or the cache 130 to the BIU 184 based on, for example, priority, nature, and/or sequence of information received from the first bridge DC module 156 and/or the cache 130.

Referring again to FIG. 1a, the first bridge unit 140 also includes a first bridge WB module 160 operatively coupled to the WB 120 of the processing core 104. The first bridge WB module 160 is also operatively coupled to an input of a multiplexer Mux 180 (included in a second bridge WB module 190 in the second bridge unit 142) and to the cache 130 (e.g., to a core WB port of the cache 130). The cache 130 (e.g., the cache WB port) is also operatively coupled to another input of the Mux 180. An output of the Mux 180 is operatively coupled to the BIU 184.

The first bridge WB module 160 operates at least in part similarly to the corresponding first bridge IC module 152 and first bridge DC module 156. For example, the first bridge WB module 160 receives information from WB 120, and transmits the received information to the Mux 180 and/or the cache 130 based on various factors, including but not limited to, nature of information, status of the cache 130, and/or the like.

For example, the first bridge WB module 160 transmits the received information to the cache 130 in case the cache 130 is present in the SOC 100, is enabled, and the received information is cacheable. On the other hand, information received by the first bridge WB module 160 from WB 120 is transmitted to the Mux 190 in case the cache 130 is not present in the SOC 100 (e.g., as illustrated in FIG. 1b) or is not operatively coupled to the bridge module 125, if the cache 130 is disabled, and/or if the received information is non-cacheable. Mux 180, upon receiving information from the bridge WB module 160, transmits the received information to the BIU 184. The Mux 180 also transmits information, received from the cache 130 (e.g., from the cache WB port), to the BIU 184. The Mux 180 selectively transmits information from the first bridge WB module 160 and/or the cache 130 to the BIU 184 based on, for example, priority, nature, and/or sequence of information received from the first bridge WB module 160 and/or the cache 130.

The bridge module 125, thus, receives information from one or more of the core bus agents, and routes information to appropriate destination (e.g., to the BIU 184 and/or to the cache 130) based on, for example, nature of received information, status of the cache 130, and/or the like. The bridge module 125 also receives information from the BIU 184 (discussed herein later in more detail), and transmits the received information to the one or more of the core bus agents and/or the cache 130 based on, for example, nature of received information, original requester of the received information, status of the cache 130, and/or the like. The bridge module 125 also receives information from the cache 130 (discussed herein later in more detail), and transmits the received information to the one or more of the core bus agents and/or the BIU 184 based on, for example, nature of received information, status of the cache 130, and/or the like.

In an embodiment, information trans-received (e.g., transmitted and/or received) by the MMU 108 is non-cacheable. Accordingly, in FIG. 1a, the MMU 108 is not operatively coupled to the cache 130 and/or to the bridge module 125. Rather, the MMU 108 directly trans-receives information (e.g., transmits information to and/or receives information from) with the BIU 184, by bypassing the bridge module 125 and the cache 130. However, in another embodiment (not illustrated in FIG. 1a), the MMU 108 is coupled to the cache 130 and/or to the bridge module 125.

Figure 2A:
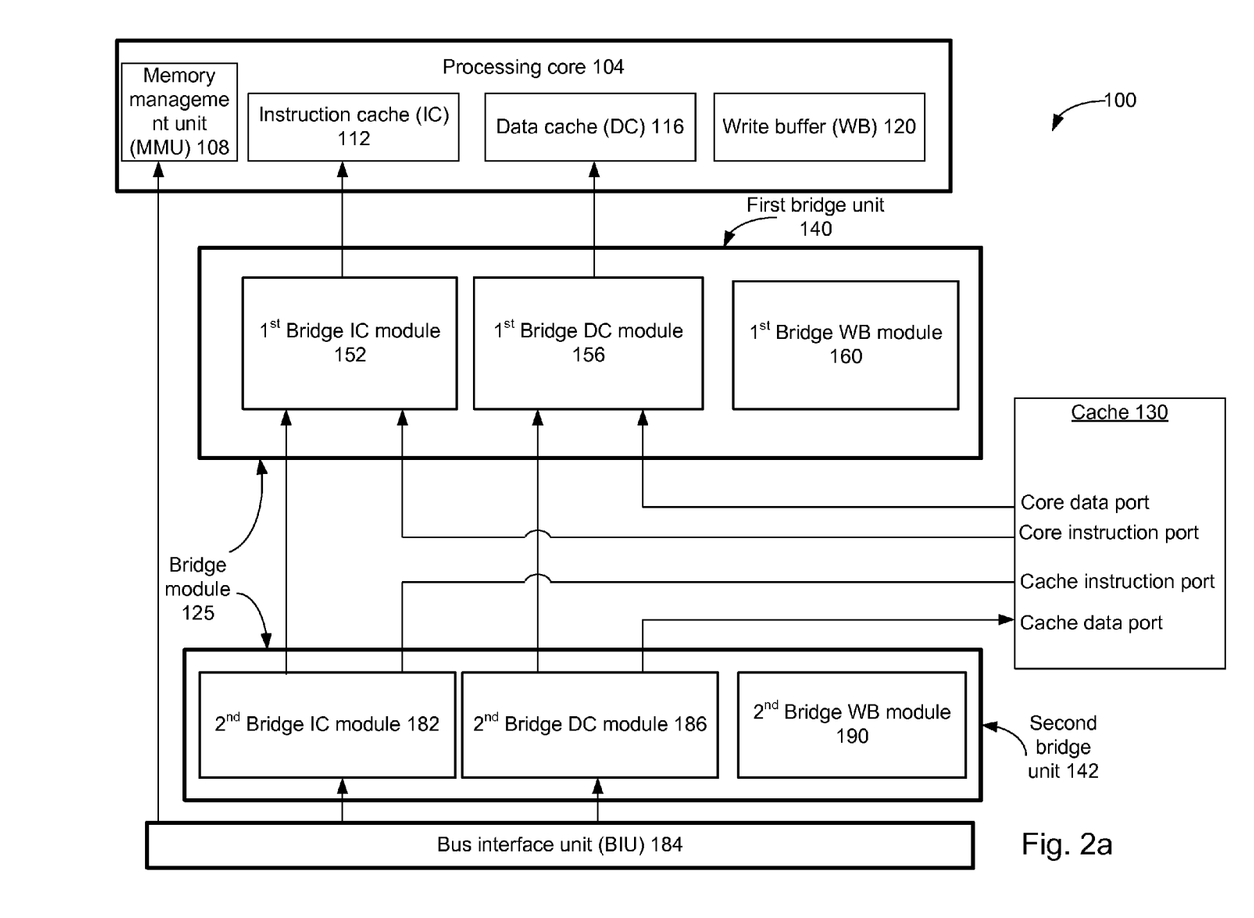
FIG. 2a schematically illustrates the SOC of FIG. 1a, with information transmitted from a bus interface unit (BIU) to a processing core and/or to a cache, and/or from the cache to the processing core, in accordance with an embodiment of the present disclosure.

In FIG. 1a, information transmission is from the processing core 104 to the cache 130 and/or to the BIU 184, and/or from the cache 130 to the BIU 184. FIG. 2a schematically illustrates the SOC 100 of FIG. 1a, with information transmitted from the BIU 184 to the processing core 104 and/or to the cache 130, and/or from the cache 130 to the processing core 104, in accordance with an embodiment of the present disclosure.

Figure 2B:
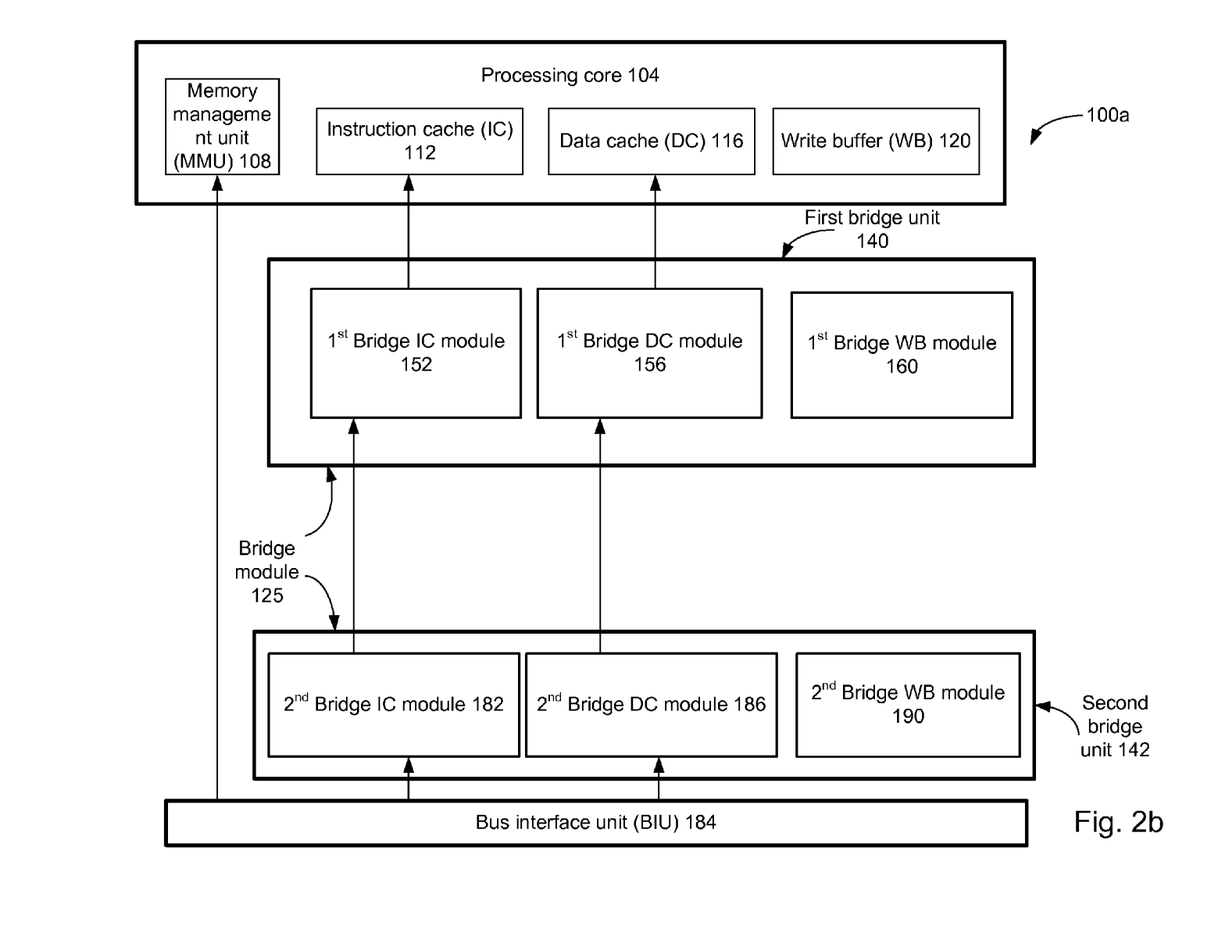
FIG. 2b schematically illustrates the SOC of FIG. 1b, with information transmitted from a BIU to a processing core, in accordance with an embodiment of the present disclosure.

As previously discussed, in an embodiment, a level 2 cache (e.g., the cache 130) may not included in the SOC 100 (or may be included in the SOC 100, but not coupled to the bridge module 125), as illustrated in FIG. 1b. FIG. 2b schematically illustrates the SOC 100a of FIG. 1b, with information transmitted from the BIU 184 to the processing core 104, in accordance with an embodiment of the present disclosure.

FIG. 2a illustrates the SOC 100, however some of the components of the SOC 100 are not illustrated in FIG. 2a for the purpose of clarity and to avoid obfuscating teaching principles of the embodiment. For example, Mux 172, Mux 176, and Mux 180 of FIG. 1a are not illustrated in the SOC 100 of FIG. 2a, although these components are present in the SOC of FIG. 2a. Similarly, FIG. 2b illustrates the SOC 100a, however some of the components of the SOC 100a are not illustrated in FIG. 2b for the purpose of clarity and to avoid obfuscating teaching principles of the embodiment.

Referring again to FIG. 2a, the second bridge IC module 182 receives information from the BIU 184. Information received by the second bridge IC module 182 may be intended for, or at least associated with, the IC 112 of the processing core 104. The second bridge IC module 182 selectively transmits the received information directly to the first bridge IC module 152 (e.g., by bypassing the cache 130) and/or to the cache 130, based on various factors, including but not limited to, nature of information (e.g., cacheable or non-cacheable information), status of the cache 130 (e.g., whether the cache 130 is present and/or enabled), the original request for the information (e.g., whether the information is received in response to a pre-fetch command of the cache 130, wherein the information is received in response to a cache miss command), and/or the like.

For example, information received by the second bridge IC module 182 is transmitted directly to the first bridge IC module 152 (e.g., by bypassing the cache 130) if the information is non-cacheable, if the cache 130 is not present in the SOC (e.g., as illustrated in FIG. 2b) or is disabled, and/or the like. In case cache 130 is present in the SOC 100 and the received information is cacheable, the received information is transmitted to the cache 130 (e.g., to the cache Instruction port in the cache 130) by the second bridge IC module 182. In an embodiment, cacheable information received by the second bridge IC module 182 is transmitted directly to the first bridge IC module 152 (for transmission to the IC 112) and to the cache 130 as well. For example, in case the information is received by the second bridge IC module 182 in response to an earlier cache miss command, the received information is transmitted directly to the IC 112 through the first bridge IC module 152 (e.g., by bypassing the cache 130) and also to the cache 130 (for caching the received information). In an embodiment, the cache 130 may pre-fetch information from a memory (e.g., any suitable memory that is internal or external to the SOC 100), anticipating, for example, that the processing core 104 may request the pre-fetched information in future. In case the information is received by the second bridge IC module 182 in response to a pre-fetch command of the cache 130, the received information is transmitted to the cache 130 (and not directly to the IC 112 through the first bridge IC module 182, as the IC 112 may not have requested the pre-fetched information yet).

Also, the cache 130 (e.g., using the core Instruction port) transmits information to the IC 112 through the first bridge IC module 152. Thus, the first bridge IC module 152 receives information from the second bridge IC module 182 and/or from the cache 130, and selectively transmits the received information to the IC 112.

Referring again to FIG. 2a, the second bridge DC module 186 receives information from the BIU 184. The second bridge DC module 186 selectively transmits the received information directly to the first bridge DC module 156 (e.g., for transmission to DC 116, by bypassing the cache 130) and/or to the cache 130, based on various factors, including but not limited to, nature of information, status of the cache 130, the original request for the information, and/or the like.

For example, in an embodiment, information received by the second bridge DC module 186 is transmitted directly to the first bridge DC module 156 (e.g., by bypassing the cache 130) if the information is non-cacheable, if the cache 130 is not present in the SOC (e.g., as illustrated in FIG. 2b) or is disabled, and/or the like. In case cache 130 is present in the SOC 100 and the received information is cacheable, the received information is transmitted to the cache 130 (e.g., to the cache data port in the cache 130) by the second bridge DC module 186. In an embodiment, cacheable information received by the second bridge DC module 186 is transmitted directly to the first bridge DC module 156 (e.g., for transmitting to the DC 116) and to the cache 130 as well. For example, in case the information is received by the second bridge DC module 186 in response to an earlier cache miss command, the received information is transmitted directly to the DC 116 through the first bridge DC module 156 and also to the cache 130 (for caching the received information). In case the information is received by the second bridge DC module 186 in response to a pre-fetch command of the cache 130, the received information is transmitted to the cache 130 (and not directly to the DC 116 through the first bridge DC module 186, as the DC 116 may not have requested the pre-fetched information yet).

Also, the cache 130 (e.g., using the core data port) transmits information to the DC 116 through the first bridge DC module 156. Thus, the first bridge DC module 156 receives information from the second bridge DC module 186 and/or from the cache 130, and selectively transmits the received information to the DC 116.

As previously discussed, the WB 120 buffers information to be written by the processing core 104 to, for example, a memory, a cache (e.g., cache 130), and/or any other component included in (or external to) the SOC 100. Accordingly, the WB 120 receives information from one or more components of the processing core 104, and transmits the received information to one or more other components of the SOC 100. However, in an embodiment, the WB 120 does not receive information directly from, for example, the BIU 184 and/or the cache 130. Accordingly, FIG. 2a illustrates the WB 120, the first bridge WB module 160 and/or the second bridge WN module 190 as not receiving information from the BIU 184 and/or the cache 130.

Also, as previously discussed, information trans-received (e.g., transmitted and/or received) by the MMU 108 may not be cacheable. Accordingly, FIG. 2a illustrates the MMU 108 receiving information directly from the BIU 184 (e.g., by bypassing the bridge module 125 and the cache 130).

As previously discussed, in an embodiment, the respective frequencies of clock signals associated with the processing core 104, cache 130 and/or the BIU 184 are different. Also, in the embodiment the operating bandwidths of the processing core 104, cache 130 and/or the BIU 184 are also different. The bridge module 125 acts as a bridge between these components, thereby allowing seamless information transfer between processing core 104, cache 130 and/or the BIU 184, notwithstanding that each possibly has a different operating frequency and/or bandwidth requirement.

Also, the bridge module 125 allows the processing core 104 and the BIU 184 to operate irrespective of whether the cache 130 is present or absent in the SOC, irrespective of whether the cache 130 is operatively coupled to the bridge module 125, and irrespective of whether the cache 130 is on or off the same die as the SOC. In an embodiment, the bridge module 125 ensures that the design and operation of the processing core 104 and/or the BIU 184 remains, at least in part, unchanged irrespective of whether the cache 130 is present or absent in the SOC. The bridge module 125 essentially makes the cache 130 transparent to the processing core 104 and/or the BIU 184. For example, a core bus agent (e.g., the IC 112) may want to transmit information to the BIU 184. However, instead of the BIU 184, the information from IC 112 is received by the bridge module 125 (e.g., by the first bridge IC module 152). Based on one or more previously discussed criteria, the bridge module 125 selectively transmits information received from the processing core 104 to the BIU and/or the cache. However, the processing core 104 may not be aware of a presence or absence of the cache 130. Rather, the processing core 104 transmits information to the bridge module 125, assuming, for example, that it is transmitting information to the BIU 184. The bridge module 125 makes the cache 130 transparent to the processing core 104. The bridge module 125 also imitates the role of the BIU 184 to the processing core 104. In a similar manner, the bridge module 125 makes the cache 130 transparent to the BIU 184. Also, the bridge module 125 imitates the role of the processing core 104 to the BIU 184.

The bridge module 125 also makes itself transparent to the processing core 104 and the BIU 184. For example, if the bridge module 125 and the cache 130 is absent in the SOC 100, the processing core 104 connects directly to the BIU 184, and the operations (and configurations) of the processing core 104 and/or the BIU 184 remains unchanged. Both the cache 130 and the bridge module 125 are transparent to the processing core 104 and the BIU 184.

Figure 3A:
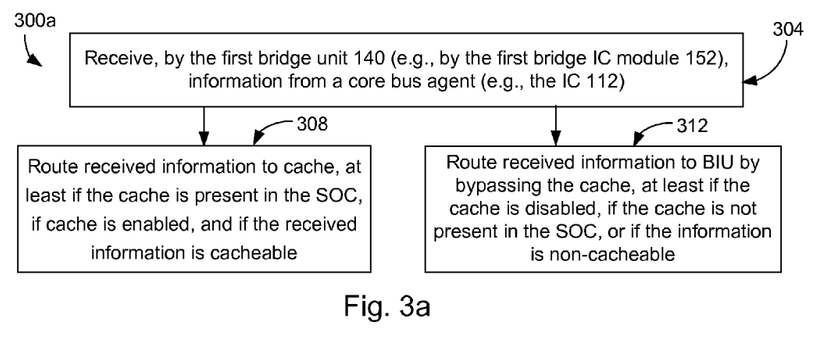
FIGS. 3a-3d illustrate methods for operating the SOCs of FIGS. 1a, 1b, 2a and/or 2b, in accordance with an embodiment of the present disclosure.

FIG. 3a illustrates a method 300a for operating the SOCs of FIGS. 1a and/or 1b, in accordance with an embodiment of the present disclosure. The method 300a includes, at 304, receiving, by one of the modules (e.g., the first bridge IC module 152) of the first bridge unit 140, information from a corresponding core bus agent (e.g., the IC 112). At 308, in accordance with an embodiment, the first bridge IC module 152 routes received information to a cache (e.g., the L2 cache 130), at least if, for example, the cache is present in the SOC 100 and is operatively coupled to the bridge module 125, if the cache 130 is enabled, and if the received information is cacheable. Alternatively (or additionally), at 312, the first bridge IC module 152 routes received information to the BIU 184 (e.g., through the second bridge IC module 182 of the second bridge unit 142) by bypassing the cache, at least if, for example, the cache is disabled, if the cache is not present in the SOC (e.g., SOC 100a in FIG. 1a) or is not operatively coupled to the bridge module 125, or if the information is non-cacheable.

Figure 3B:
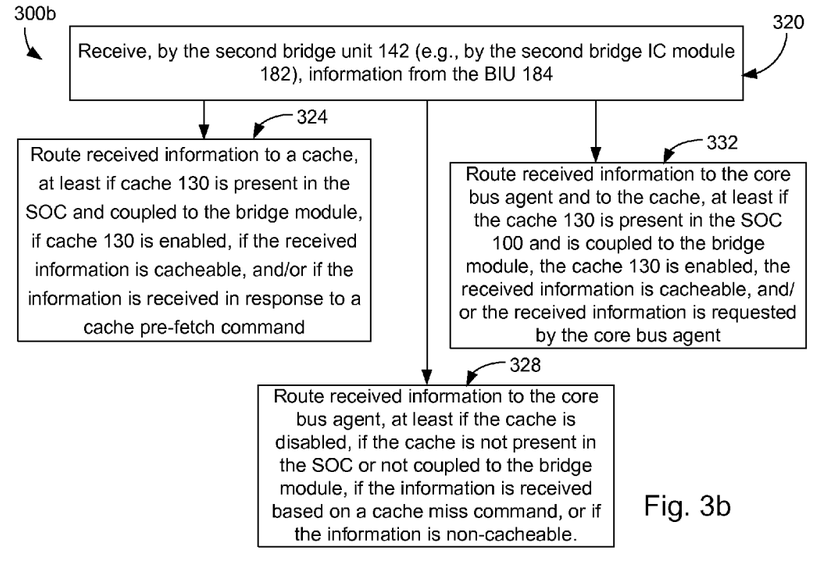

FIG. 3b illustrates another method 300b for operating the SOCs of FIGS. 2a and/or 2b, in accordance with an embodiment of the present disclosure. The method 300b includes, at 320, receiving, by one of the modules (e.g., by the second bridge IC module 182) of the second bridge unit 142, information from the BIU 184. At 324, the second bridge IC module 182 routes received information to the cache 130, at least if, for example, cache 130 is present in the SOC 100 and is operatively coupled to the bridge module 125, if cache 130 is enabled, if the received information is cacheable and/or if the information is received in response to a cache pre-fetch command. Alternatively, at 328, second bridge IC module 182 routes received information to the associated core bus agent (e.g., IC 112) through the first IC bridge unit 152, at least, for example, if the cache 130 is disabled, if the cache 130 is not operatively coupled to the bridge module 125, if cache 130 is not present in the SOC 100, if the information is received based on a cache miss command, and/or if the information is non-cacheable. Alternatively, at 332, information received by the second bridge unit 142 is routed to the cache 130 and also to the core bus agent in case, for example, the cache 130 is present in the SOC 100 and is operatively coupled to the bridge module 125, the cache 130 is enabled, the received information is cacheable, and the received information is requested by the core bus agent. Routing the information to the core bus agent along with routing the information to the cache (e.g., instead of routing the information to the core bus agent through the cache) decreases the latency of passing data from the BIU 184 to the core bus agent.

Figure 3C:
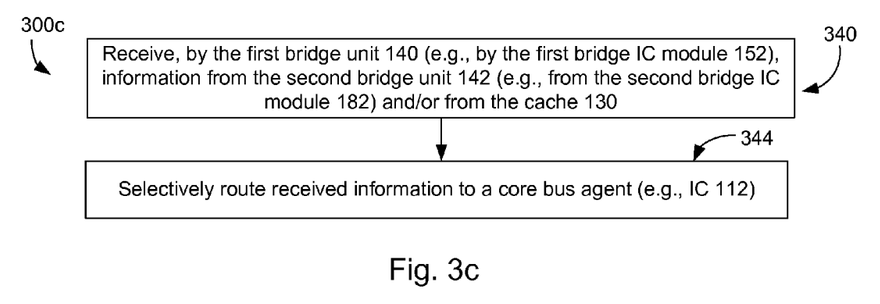

FIG. 3c illustrates another method 300c for operating the SOCs of FIGS. 1a and/or 1b, in accordance with an embodiment of the present disclosure. The method 300c includes, at 340, receiving, by one of the modules (e.g., by the first bridge IC module 152) of the first bridge unit 140, information from the second bridge unit 142 (e.g., from the second bridge IC module 182) and/or from the cache 130. At 344, the first bridge IC module 152 selectively routes the received information to a corresponding core bus agent (e.g., IC 112). For example, the first bridge IC module 152 may include a multiplexer (not illustrated in FIGS. 1a and 1b) to multiplex information received from the second bridge IC module 182 and/or from the cache 130, and output the multiplexed information to the IC 112.

Figure 3D:
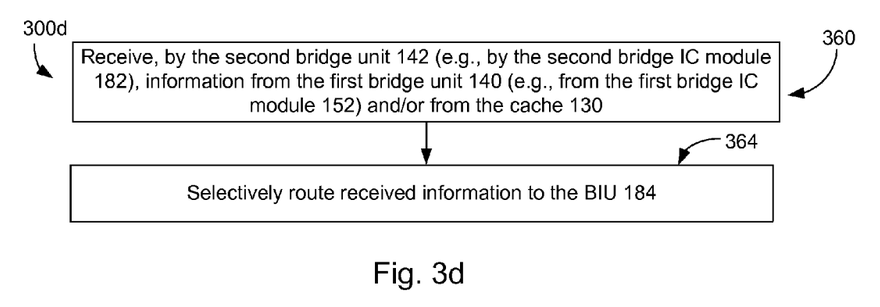

FIG. 3d illustrates another method 300d for operating the SOCs of FIGS. 2a and/or 2b, in accordance with an embodiment of the present disclosure. The method 300d includes, at 360, receiving, by one of the modules (e.g., by the second bridge IC module 182) of the second bridge unit 142, information from the first bridge unit 140 (e.g., from the first bridge IC module 152) and/or from the cache 130. At 364, the second bridge IC module 182 selectively routes received information to the BIU 184.

Although specific embodiments have been illustrated and described herein, based on the foregoing discussion it is appreciated by those of ordinary skill in the art and others, that a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. This application is intended to cover any adaptations or variations of the embodiment discussed herein. Therefore, it is manifested and intended that the disclosure be limited only by the claims and the equivalents thereof.

What is claimed is:

1. A system on a chip (SOC) comprising:
a processing core;
a cache; and a bridge module configured to provide the processing core selective access to the cache, the bridge module comprising a first bridge unit and a second bridge unit, the first bridge unit configured to (i) receive a series of transaction requests from the processing core, and (ii) selectively route ones of the transaction requests from the processing core to one or both of the second bridge unit and the cache, the second bridge unit having (i) a first input coupled to the first bridge unit, (ii) a second input coupled to the cache, and (iii) an output coupled to a communication bus interface.

2. The SOC of claim 1, wherein the first bridge unit is further configured to:
receive, from the processing core, a first transaction request comprising first data; and
route the received first transaction request comprising the first data from the processing core to the cache.

3. The SOC of claim 2, wherein the first bridge unit is further configured to:
refrain from routing the received first transaction request comprising the first data from the processing core to the second bridge unit.

4. The SOC of claim 2, wherein the first bridge unit is further configured to:
receive, from the processing core, a second transaction request comprising second data; and
route the received second transaction request comprising the second data from the processing core to the second bridge unit, without routing the received second transaction request comprising the second data from the processing core to the cache.

5. The SOC of claim 1, wherein:
the second bridge unit comprises a multiplexer, the multiplexer having (i) the first input coupled to the first bridge unit, (ii) the second input coupled to the cache, and (iii) the output coupled to the communication bus interface.

6. The SOC of claim 1, further comprising:
the communication bus interface.

7. The SOC of claim 1, wherein the second bridge unit is further configured to:
receive a first transaction request comprising first data from the communication bus interface; and
selectively route the received first transaction request comprising the first data from the communication bus interface to one or both of the processing core and the cache.

8. The SOC of claim 1, wherein the second bridge unit is further configured to:
receive, from the communication bus interface, a first transaction request comprising first data; and
route the received first transaction request comprising the first data from the communication bus interface to the cache, without routing the received first transaction request comprising the first data from the communication bus interface to the processing core.

9. The SOC of claim 1, wherein the second bridge unit is further configured to:
receive, from the communication bus interface, a first transaction request comprising first data; and
route the received first transaction request comprising the first data from the communication bus interface to the processing core, without routing the received first transaction request comprising the first data from the communication bus interface to the cache.

10. The SOC of claim 1, wherein the second bridge unit is further configured to:
receive, from the communication bus interface, a first transaction request comprising first data;
determine that the first transaction request is a pre-fetch command of the cache; and
responsively to determining that the first transaction request is a pre-fetch command of the cache, route the first data from the communication bus interface to the cache, without routing the first data from the communication bus interface to the processing core.

11. The SOC of claim 1, wherein the second bridge unit is further configured to:
receive transaction requests from one or both of the first bridge unit and the cache; and
multiplex the received transaction requests from one or both the first bridge unit and the cache to the communication bus interface.

12. The SOC of claim 1, wherein:
the processing core comprises a first core bus agent and a second core bus agent; and
the first bridge unit comprises
a first module to (i) receive a first transaction request from the first core bus agent, and (ii) selectively route the received first transaction request from the first core bus agent to one or both of the second bridge unit and the cache, and
a second module to (i) receive a second transaction request from the second core bus agent, and (ii) selectively route the received second transaction request from the second core bus agent to one or both of the second bridge unit and the cache.

13. The SOC of claim 12, wherein:
the first core bus agent is one of an instruction cache, an information cache, and a write buffer; and
the second core bus agent is another of the instruction cache, the information cache, and the write buffer.

14. The SOC of claim 1, wherein the cache is a level 2 (L2) cache.

15. The SOC of claim 1, wherein the cache is clocked by a first clock signal having a first frequency that is different from a second frequency of a second clock signal that clocks the processing core.

16. A system on a chip (SOC) comprising:
a processing core comprising a first core bus agent and a second core bus agent;
a cache; and
a bridge module comprising a first bridge unit and a second bridge unit, the first bridge unit comprising
a first module configured to selectively provide the first core bus agent access to one of the cache and the second bridge unit, and
a second module configured to selectively provide the second core bus agent access to one of the cache and the second bridge unit,
wherein the second bridge unit comprises
a third module configured to (i) receive a first transaction request from a communication bus interface, and (ii) selectively route the received first transaction request from the communication bus interface to one or both of the first module of the first bridge unit and the cache, and
a fourth module configured to (i) receive a second transaction request from the communication bus interface, and (ii) selectively route the received second transaction request from the communication bus interface to one or both of the second module of the first bridge unit and the cache, and
wherein the third module of the second bridge unit comprises a multiplexer having (i) a first input coupled to the first module of the first bridge unit, (ii) a second input coupled to the cache, and (iii) an output coupled to the communication bus interface.

17. The SOC of claim 16, wherein:
the first module is further configured to (i) receive a first transaction request from the first core bus agent, and (ii) selectively route the received first transaction request from the first core bus agent to one of the second bridge unit and the cache; and
the second module is further configured to (i) receive a second transaction request from the second core bus agent, and (ii) selectively route the received second transaction request from the second core bus agent to one or both of the second bridge unit and the cache.

18. The SOC of claim 16, wherein the cache is a level 2 (L2) cache.

* * * * *